US008332772B2

(12) United States Patent
Janzen et al.

(10) Patent No.: US 8,332,772 B2
(45) Date of Patent: Dec. 11, 2012

(54) PROVIDING STRUCTURED VISUALIZATIONS OF EXPRESSIONS IN AN EXPRESSIONS EDITOR

(75) Inventors: Douglas Stuart Janzen, Vancouver (CA); Richard Bruce Cameron, Vancouver (CA); Davor Cubranic, Vancouver (CA)

(73) Assignee: Business Objects Software Limited, Dublin (IE)

( * ) Notice: Subject to any disclaimer, the term of this patent is extended or adjusted under 35 U.S.C. 154(b) by 889 days.

(21) Appl. No.: 11/871,957

(22) Filed: Oct. 12, 2007

(65) Prior Publication Data

US 2009/0100360 A1    Apr. 16, 2009

(51) Int. Cl.
*G06F 3/00* (2006.01)
(52) U.S. Cl. .......................... 715/771; 715/769; 715/780
(58) Field of Classification Search .................. 715/751, 715/771, 769, 780
See application file for complete search history.

(56) References Cited

U.S. PATENT DOCUMENTS

| | | | | |
|---|---|---|---|---|
| 5,428,776 A * | 6/1995 | Rothfield | | 1/1 |
| 5,721,901 A * | 2/1998 | Banning et al. | | 1/1 |
| 5,909,678 A * | 6/1999 | Bergman et al. | | 1/1 |
| 5,950,190 A * | 9/1999 | Yeager et al. | | 1/1 |
| 5,963,938 A * | 10/1999 | Wilson et al. | | 1/1 |
| 6,816,855 B2 * | 11/2004 | Hartel et al. | | 1/1 |
| 6,925,608 B1 * | 8/2005 | Neale et al. | | 715/763 |
| 6,934,696 B1 * | 8/2005 | Williams et al. | | 706/47 |
| 7,003,730 B2 * | 2/2006 | Dettinger et al. | | 715/764 |
| 7,665,030 B2 * | 2/2010 | Sauermann et al. | | 715/777 |
| 2002/0059297 A1 * | 5/2002 | Schirmer et al. | | 707/104.1 |
| 2002/0078103 A1 * | 6/2002 | Gorman et al. | | 707/530 |
| 2006/0224959 A1 * | 10/2006 | McGuire et al. | | 715/700 |
| 2007/0157074 A1 * | 7/2007 | Breedvelt-Schouten et al. | | 715/503 |
| 2009/0007021 A1 * | 1/2009 | Hayton | | 715/843 |
| 2009/0024940 A1 * | 1/2009 | Zeringue et al. | | 715/763 |
| 2009/0307598 A1 * | 12/2009 | Giles | | 715/738 |
| 2009/0307604 A1 * | 12/2009 | Giles et al. | | 715/751 |
| 2010/0281350 A1 * | 11/2010 | Xie et al. | | 714/811 |

* cited by examiner

*Primary Examiner* — Ryan Pitaro
(74) *Attorney, Agent, or Firm* — Mintz, Levin, Cohn, Ferris, Glovsky and Popeo, P.C.

(57) ABSTRACT

A computer readable storage medium comprises executable instructions to provide a workspace for a user to define an expression with expression components from a graphical palette associated with the workspace. Placeholders are indicated in the workspace for the expression components to be added by the user. The placeholders are associated with a data type. The data type is enforced for each placeholder. A structured visual representation of the expression is provided on the workspace.

16 Claims, 7 Drawing Sheets

PROVIDING STRUCTURED VISUALIZATIONS OF EXPRESSIONS IN AN EXPRESSIONS EDITOR

BRIEF DESCRIPTION OF THE INVENTION

This invention relates generally to creating expressions in a digital data processing environment. More particularly, this invention relates to techniques for providing easily readable and structured visual representations of expressions in an expressions editor.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, and performance management applications to provide business metrics, dashboards, and scorecards, as well as best-practice analysis techniques for gaining business insights.

In many organizations establishing business strategies is an increasingly complex exercise. There are ongoing efforts to supply quantitative tools to enhance business strategy decision making. In particular, there is an increasing focus on applications and tools that provide a quantitative framework for analyzing various measures. A measure is a quantity as ascertained by comparison with a standard, usually denoted in units such as units sold, dollars, and so on. Measures are typically used to evaluate a quantifiable component of an organization's performance. For example, measures may include return on investment, revenue, sales volume, unit sales, store sales, inventory levels, cycle times, supply chain costs, number of customers, and so on.

Measures may be associated with dimensions, which are a type of data model object that represent a side of a multidimensional cube, a category, a column or a set of data items within a data source. Each dimension represents a different category. In a message stream data source, a field within a message is a dimension. Dimension definitions support the specification of hierarchies to form a hierarchical dimension. Members of a dimension may be defined through a filter or transform. Examples of dimensions include region, store, year, customer, employee, and product line, among others.

Measures are often evaluated as part of an expression, such as a mathematical expression, data source query, message/string building expressions, and the like, to assess a business strategy and to prescribe a course of action. For example, consider a retail organization trying to optimize its performance. A store manager may be interested in increasing its "store sales" measure for the current quarter. To perform a detailed assessment, the store manager may have to analyze the average "store sales" measure during the previous quarters, broken down by dimensions such as "brand name" and "customer residence." The store manager may also have to compare the "store sales" measure for a given store with the "store sales" measure of other comparable stores in the retail organization. In doing so, the store manager would like to be able to create expressions that perform calculations for one or more measures broken down by one or more dimensions.

There are a number of commercially available tools for creating expressions to perform calculations for business measures. For example, Microsoft Office Excel, available from Microsoft Corporation of Redmond, Wash., allows users to insert mathematical expressions on spreadsheets using a simple drag-and-drop expressions editor that also interacts with other Microsoft Office products, such as Microsoft Word and PowerPoint. Another simple and easy-to-use tool is DragMath, an open-source editor that allows users to build mathematical expressions in a traditional two-dimensional way using a graphical drag-and-drop interface. In addition, Business Objects Americas of San Jose, Calif., provides a Crystal Reports Selection Editor for performing database query selections across multiple criteria.

These and other tools for creating expressions are limited in that they do not provide a structured visual representation of the expressions in their graphical interfaces. A user creating expressions with these editors simply drags expression components, such as mathematical operators, relational symbols, and aggregators, among others, into a workspace to form an expression. Any structure in the expression is introduced by the user himself and not enforced by the tool.

For example, DragMath allows users to create mathematical equations using proper syntax and export them to a file. While it does indicate where values (e.g., variables and or numbers) are required, it does not enforce an order of operations. Mathematical delimiters such as brackets to denote an order of operations in the expressions have to be inserted in the workspace by the user and are not enforced by DragMath. Furthermore, because the mathematical equations that can be created with DragMath only take numerical values in the form of variables and numbers, DragMath does not indicate or enforce the data types of expression components as the user is creating an expression in the workspace.

Likewise, the Business Object's Crystal Reports Selection Editor does not enforce a structure for expressions created in its workspace. The Selection Editor provides a drag-and-drop interface for creating database selection expressions. The user is provided a list of all available variables, functions and operators, which can be dragged to an editing workspace, but they can also create portions of the expressions manually. The Selection Editor does not enforce any syntax rules until the user requests a syntax check or attempts to save the created expression. This can result in a very repetitive process of checking the syntax, fixing the errors and checking the syntax again. This is particularly difficult with long, complex selection formulas as there is no indication as to what portion of the expression the error refers.

These tools also do not allow users to visualize the semantic structure of the expressions. The semantic structure of an expression defines how the expression components relate to one another. For example, the "store sales" measure mentioned above could be broken down by multiple dimensions, such as "time," "brand name," "customer residence," etc., to provide the manager a detailed analysis of the store's performance. The semantic structure defines this relationship.

The currently-available expressions editors do not illustrate the semantic relationships between expression components. Doing so may make it easier for users to interpret how certain expression components affect the expression as a whole and anticipate the result of the expressions.

Accordingly, it would be desirable to provide techniques to address the shortcomings of existing expressions editors. In particular, it would be desirable to provide an expressions editor that creates an easily readable visualization of the semantic relationships within the expressions, illustrated through the layout of the expression components.

SUMMARY OF THE INVENTION

The invention includes a computer readable medium with executable instructions to provide a workspace for a user to define an expression with expression components from a graphical palette associated with the workspace. Placeholders are indicated in the workspace for the expression components to be added by the user. The placeholders are associated with a data type. The data type is enforced for each placeholder. A structured visual representation of the expression is provided on the workspace.

The invention also includes a computer readable medium with executable instructions to populate a graphical palette of expression components based on a data source. Placeholders are provided in a workspace for a user to create an expression with the expression components from the graphical palette with the expression having one or more aggregations. Filters and dimensions are associated with the one or more aggregations in the expression. A data type for each placeholder is enforced when the user selects an expression component from the graphical palette.

The invention further includes a method for creating expressions. A graphical palette of expression components is provided. A workspace for a user to create expressions with the expression components is also provided. Data types are enforced for expression components when inserted into the workspace. A structured visual representation of the expressions is provided as the expression components are inserted in the workspace.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

The present invention provides a system, method, software arrangement, and computer readable storage medium for creating expressions. As generally used herein, an expression may be any combination of numbers, operators, variables, and grouping symbols arranged in a way which can be evaluated. Examples of expressions include mathematical expressions, data source queries or portions thereof, and message/string building expressions, among others. The numbers, operators, variables and grouping symbols forming an expression are referred to herein as expression components. An expression component may be any element or member of an expression.

According to an embodiment of the invention, expression components within an expression may be part of a semantic layer. A semantic layer or domain, as generally used herein, is the term for a level of abstraction based on a relational, OLAP, or other data source or a combination of more than one data sources or existing semantic layers. The semantic layer includes data model objects that describe the underlying data source and define dimensions, attributes and measures that can be applied to the underlying data source and data foundation metadata that describes a connection to, structure for, and aspects of the underlying data source.

As generally used herein, a data source is an information resource. Data sources include sources of data that enable data storage and retrieval. Data sources may include databases, such as, relational, transactional, hierarchical, multi-dimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity ("ODBC") and the like. Data sources may also include a data source where the data is not stored like data streams, broadcast data, and the like. Data sources are comprised of values and objects, such as dimensions, columns, rows, attributes, measures and the like, otherwise referred to as data model objects.

A semantic layer can be used as a level of abstraction to combine partial data sets from any number of original data sources. A semantic layer can also be used to provide logical sets to which data can be associated so that data from a wide number of sources can be meaningfully aggregated. Metadata concerning the data, such as a value for data freshness, can also be associated with the data within the logic of a semantic domain. Semantic domain technology is disclosed in the following commonly-owned U.S. Pat. Nos. 5,555,403; 6,247,008; 6,578,027; and 7,181,435, which are incorporated herein by reference.

Typically, a data model object is assigned a common business term such that the user does not need to understand the specific logic of the underlying data source but can work with familiar terminology when constructing queries or otherwise accessing the data. Examples of common business terms include customer, employee, product line, revenue, profit, attrition, fiscal year, quarter, and the like.

According to an embodiment of the invention, data model objects within a data source may be evaluated as expression components within an expression created in a user friendly Graphical User Interface ("GUI"), such as, for example, a drag-and-drop interface. A drag-and-drop interface refers to an interface in which a user performs actions by clicking on an item of the interface (e.g., an icon, menu item, etc.) and dragging it to a different location or onto another item. In general, it can be used to invoke many kinds of actions, such as copying or moving, or to create various types of associations between two items.

The GUI for creating expressions includes a graphical palette of expression components and a workspace. The expression components may include data model objects or message fields, data aggregations (e.g., summations), functions, operators, time periods, Boolean list operators, integer constants, floating point constants, string constants, and Boolean constants. The expression components may also include measures, dimensions, date constants, database columns/facets, attributes and the like.

According to an embodiment of the invention, the GUI may be used for creating expressions to monitor data from an incoming message stream, identify messages that meet specified criteria and output an appropriate response action. The GUI can also be used to create a report selection formula, create a query on a semantic layer or data source, or to define any expression that performs a calculation from one or more data inputs and constant values.

Figure 1:
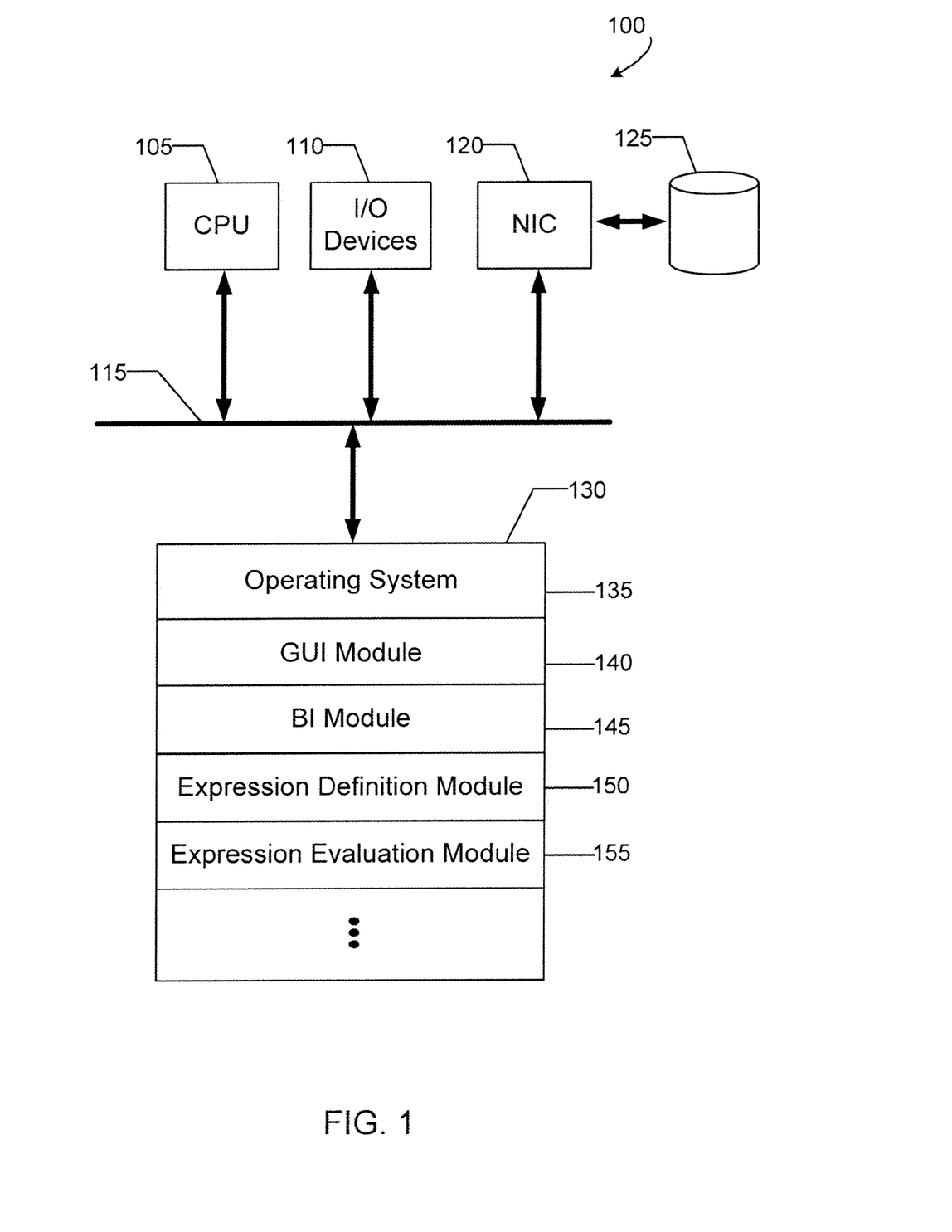
FIG. 1 illustrates a computer constructed in accordance with an embodiment of the invention.

FIG. 1 illustrates a computer configured in accordance with an embodiment of the invention. Computer 100 includes standard components, including a Central Processing Unit ("CPU") 105 and input/output devices 110, which are linked by a bus 115. Input/output devices 110 may include a keyboard, mouse, touch screen, monitor, printer, and the like.

Network Interface Circuit ("NIC") 120 may also be connected to the bus 115. NIC 120 provides connectivity to a network (not shown), thereby allowing computer 100 to operate in a networked environment. For example, networked data sources 125 are connected to computer 100 through NIC 120. In accordance with the present invention, networked data sources 125 may include any number and type of data sources, such as, for example, OLAP, OLTP and relational databases, among others.

Memory 130 is also connected to the bus 115. In one exemplary embodiment, memory 130 stores one or more of the following modules: an operating system module 135, a Graphical User Interface ("GUI") module 140, a Business Intelligence ("BI") module 145, an Expression Definition module 150, and an Expression Evaluation module 155.

Operating system module 135 may include instructions for handling various system services, such as file services or for performing hardware dependant tasks. The GUI module 140 may rely upon standard techniques to produce graphical components of a user interface, e.g., windows, icons, buttons, menu and the like, for accessing and managing data in networked data sources 125.

BI module 145 includes executable instructions to perform BI-related functions, such as, performing abstract queries and analyses, producing reports, accessing data sources such as relational and/or multidimensional databases, accessing document storage repositories, and the like.

In accordance with the present invention, Expression Definition module 150 includes executable instructions for creating expressions in a user-friendly GUI. The user-friendly GUI includes a graphical palette of expression components and a workspace. Users may create expressions in the workspace by selecting expression components from the graphical palette and inserting them into the workspace as described in more detail herein below.

In one embodiment, the GUI may be a drag-and-drop GUI. In this embodiment, users may create expressions in the workspace by dragging expression components from the graphical palette and dropping them into the workspace.

The expressions created with Expression Definition module 150 are evaluated in Expression Evaluation module 155. This module interacts with networked data sources 125 and BI module 145 to perform the operations defined in the expressions, such as, for example, data aggregations on data model objects, and return the expression results. In one embodiment, expression results may be displayed in the workspace of the expressions creation GUI.

It should be appreciated that the executable modules stored in memory 130 are exemplary. It should also be appreciated that the functions of the modules may be combined. For example, Expression Definition module 150 and Expression Evaluation module 155 may be integrated into a single module without deviating from the scope and principles of the invention. In addition, the functions of the modules need not be performed on a single machine. Instead, the functions may be distributed across a network, if desired. Indeed, the invention may be commonly implemented in a client-server environment with various components being implemented at the client-side and/or the server-side. As understood by those of ordinary skill in the art, it is the functions of the invention that are significant, not where they are performed or the specific manner in which they are performed.

Figure 2:
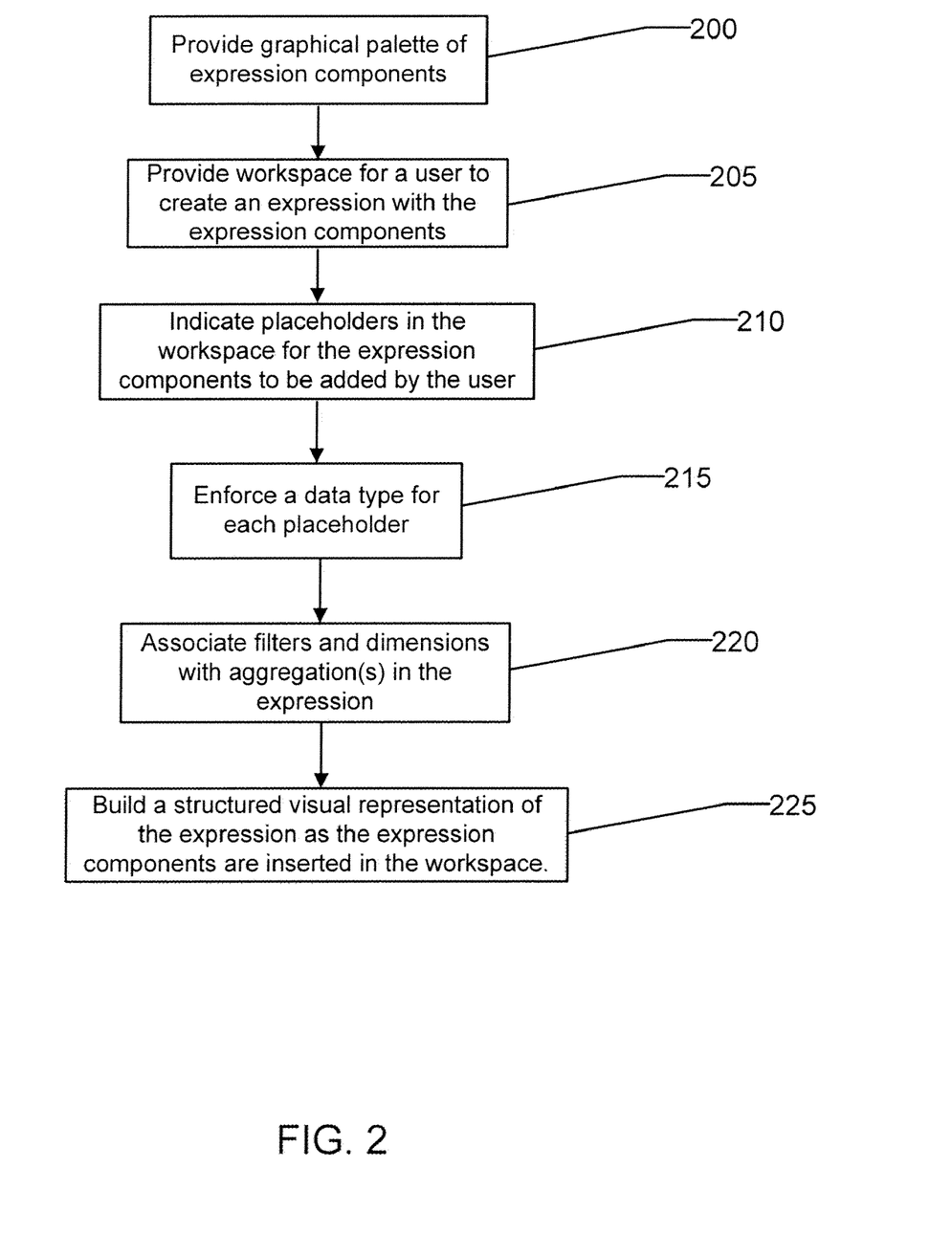
FIG. 2 illustrates a flow chart for creating expressions in accordance with an embodiment of the invention.

Referring now to FIG. 2, a flow chart for creating expressions in accordance with an embodiment of the invention is described. The operations of FIG. 2 may be implemented using Expression Definition module 150 either independently or in conjunction with GUI module 140. Initially, Expression Definition module 150 provides a graphical palette of expression components (200). The graphical palette includes a window panel with widgets representing different types of expression components, such as data model objects or message fields data aggregations, functions, operators, time periods, Boolean list operators, integer constants, floating point constants, string constants, and Boolean constants. The expression components may also include measures, dimensions, date constants, database columns/facets, attributes, and the like.

Expressions Definition module 150 also provides a workspace for a user to create expressions with the expression components in the graphical palette (205). The workspace is a window panel where the user can easily view the expressions created. Expression components are selected by the user from the graphical palette and inserted onto placeholders located in the workspace (210). The placeholders lay out the visual structure of the expressions in the workspace to illustrate the semantic relationships between the expression components.

The placeholders also indicate the data type of the expression components that may be placed onto them. For example, in an expression having a mathematical operator such as a multiplication of two arguments, the placeholders for the arguments are tagged to accept only constants or numerical data model objects that can be multiplied. The data type for each placeholder is enforced when the user selects an expression component from the graphical palette to be added into the placeholder (215). If the user selects an expression component of a data type different than the one expected by the placeholder, an error alert will be displayed to the user as described in more detail below. For example, if the user selects a string constant for one of the placeholders indicating the arguments of a multiplication and the placeholder is expecting a numerical constant or data model object, the user receives an error alert that the string constant cannot be placed into that placeholder.

Expression Definition module 150 also stages the expression definition process. Whenever a user adds an aggregation to an expression, Expression Definition module 150 provides a window panel on the workspace beneath the aggregation for defining aggregation filters and dimensions, as described in more detail below. Expression Definition module 150 then associates these filters and dimensions with the aggregation (220).

For example, an aggregation of the data model object "store sales" may be filtered on "brand name" and broken down over the dimensions "customer country" and "time." This way the aggregation for "store sales" is performed for a given "brand name" broken down by "customer country" and time period. This gives the user the flexibility to perform detailed business analyses as desired.

Expression Definition module 150 also provides a structured visual representation of the expression as expression components are inserted into the workspace (225). This is performed by, for example, automatically adding mathematical delimiters, e.g., brackets, when necessary to illustrate the order of operations to the user, as described in more detail below.

The structured visual representation of the expression enables the user to easily view the semantic relationships between the expression components, While an expression may be based on a semantic layer, it is important to note that the semantic relationships between expression components are defined by the semantic structure of the expression. These semantic relationships define how each expression component affects the sub-expressions and the results of the overall expression and not how data model objects are related in the semantic layer. For example, the use of mathematical delimiters in the expression enables the user to easily identify sub-expressions within the expression and how they are related within the expression by the various operators and other expression components therein.

Figure 3:
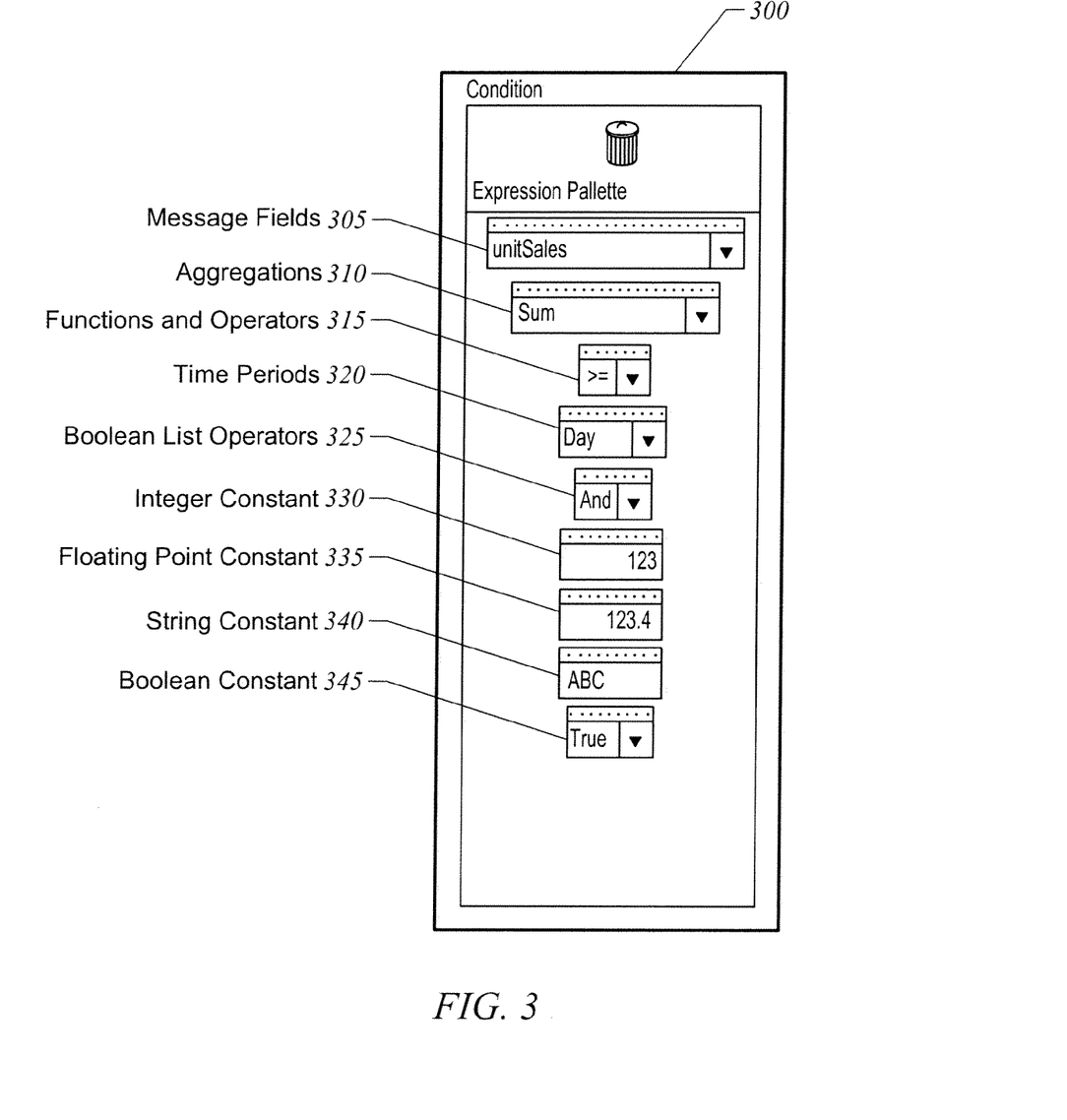
FIG. 3 illustrates a graphical palette according to an embodiment of the invention.

Referring now to FIG. 3, a graphical palette according to an embodiment of the invention is described. Graphical palette 300 includes a window panel with drop-down menus and textboxes for different types of expression components, such as: data model objects 305, aggregations 310, functions and operators 315, time periods 320, Boolean list operators 325, integer constants 330, floating point constants 335, string constants 340, and Boolean constants 345. Other expression components such as measures, dimensions, data constants, database columns/facets, and attributes may be added to graphical palette 300.

Data model objects 305, aggregations 310, functions and operators 315, time periods 320, Boolean list operators 325 and Boolean constants 345 can be added to an expression in the workspace by using the pre-populated dropdown menus in graphical palette 300 and selecting the desired value. In this case, dropdown menus for data model objects 305 and aggregations 310 are pre-populated based on the underlying data source.

Integer constants 330, floating point constants 335, and string constants 340 can be added to an expression in the workspace by using the corresponding textboxes in graphical palette 300. Integer constants 330, floating point constants 335, and string constants 340 each have their own textboxes for receiving an input from the user and checking the input for the correct value format. In this case, the numeric textboxes for integer constants 330 and floating point constants 335 do not allow non-numeric characters to be entered.

Each expression component listed in graphical palette 300 can be flexible in its data type. For example, message fields or data model objects 305 can represent any data type depending on the data model object selected, e.g., "store sales" represents a floating point, "sales date" represents a date, "store" represents a string, and so on. Functions and operators 315 may be applied to strings, Booleans, dates, and numbers when appropriate. For example, the operators "+", ">" "<", "<=", ">=" and "=" can be used on strings, but "-", "*" and "/" can only be applied to numerical arguments.

Figure 4:
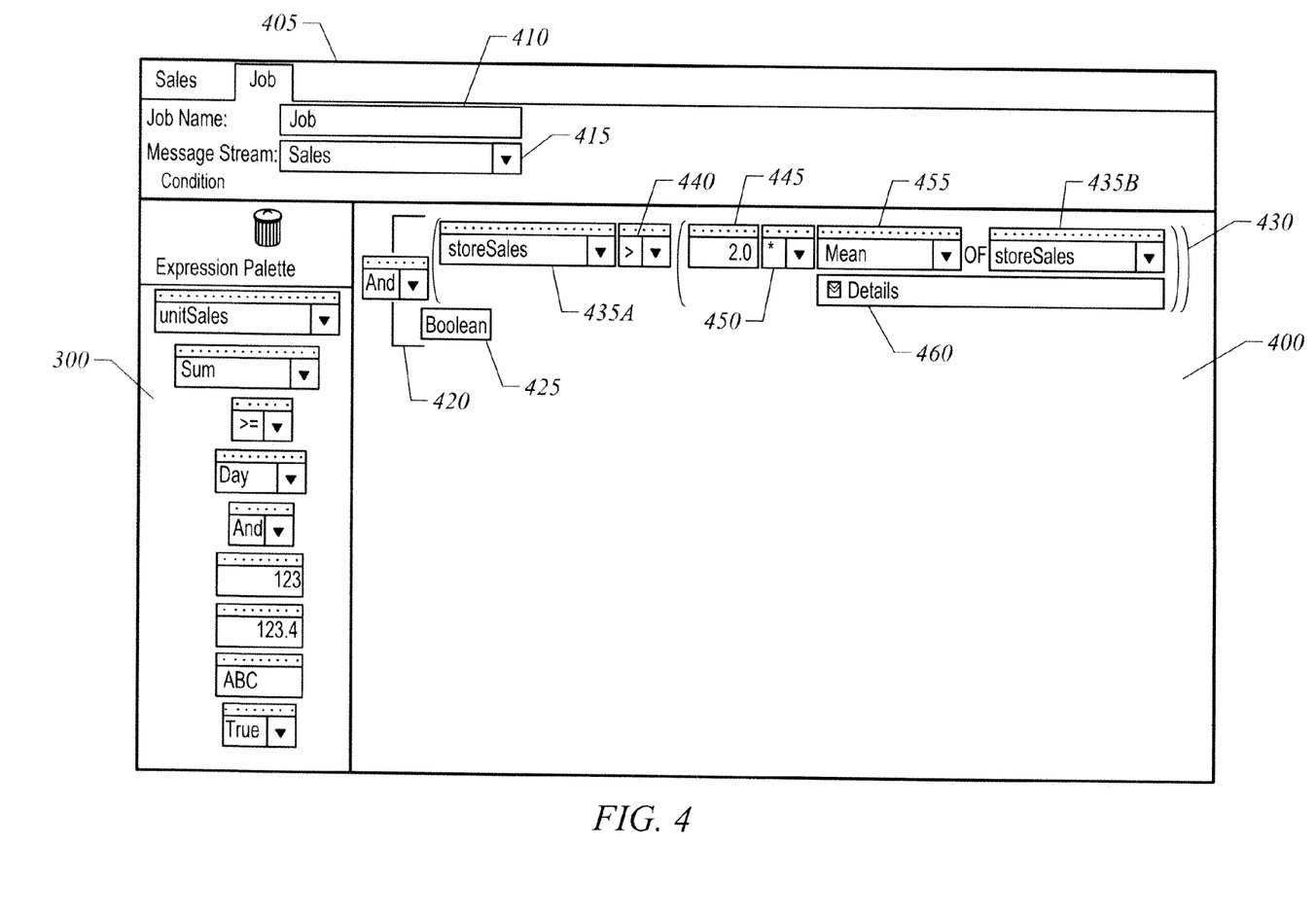
FIG. 4 illustrates an exemplary workspace and graphical palette according to an embodiment of the invention.

An exemplary workspace associated with graphical palette 300 is illustrated in FIG. 4. Workspace 400 is located next to graphical palette 300 on a window 405. Window 405 includes dropdown menu 415 for specifying an underlying data source and textbox 410 for specifying a title for the expressions to be created in the workspace. The title can be used as a filename for saving the expressions created in a format accessible by other modules in a BI application, such as, for example, by BI module 145 associated with Expression Definition module 150.

In one embodiment, workspace 400 may be initialized with a Boolean list operator and Boolean placeholders, such as Boolean list operator 420 and Boolean placeholder 425. Once an expression component from graphical palette 300 is inserted onto Boolean placeholder 425, a new Boolean placeholder is created. There is always an extra Boolean placeholder at the end of the list of Booleans grouped within a Boolean list operator.

It is appreciated that initializing workspace 400 with a Boolean list operator is not required. Any other data type may be used to initialize workspace 400. The initial operator may be selected as desired to provide initial guidance to the user in creating expressions in workspace 400.

The user may begin constructing an expression in workspace 400 by selecting any expression component from graphical palette 300 and inserting it onto the placeholder associated with the initial operator. However, it is best to select a desired Boolean list operator, operator or function first, as these have arguments associated with them and will create new placeholders. For example, when a Boolean list operator, operator or function is inserted into the initial placeholder, additional placeholders will be created for the operator arguments, each labeled with the expected argument data type to complete a valid expression. Similarly, when an aggregation component is selected, placeholders are created for the data model object to perform the aggregation on and for filters and dimensions to limit the aggregation scope. When a time period is selected, placeholders are created for the offset and the date or data model object to base the time period on.

In one embodiment, when a constant is selected, no placeholders are created. In another embodiment, when a constant is selected, the applicable operator(s) are added and the applicable placeholder(s) created. If no placeholder is available in the position where the user needs to add an expression component, the user can insert the component on the edge of one of the adjacent components.

For example, workspace 400 shows expression 430 that was created by a user by selecting data model objects 435a-b ("storeSales"), operator 440 (">"), floating point constant 445 ("2.0"), operator 450 (and aggregator 455 ("Mean") and inserting them into their corresponding placeholders. Each one of these expression components was selected by the user from graphical palette 300 and inserted into placeholders in workspace 400. With each expression component inserted into the expression, additional placeholders are created as appropriate. For example, when the user inserts aggregator 455 into workspace 400, a placeholder expecting a data model object is automatically created next to aggregator 455. The user then selects data model object 435b to be placed into that placeholder.

After an expression is created in the workspace, the user can easily change the expression by modifying the expression components in the expression or by adding new expression components to the expression. For example, if the user needs to change the expression from "storeSales>2*Mean of storeSales" to "storeSales+100>2*Mean of storeSales," he could insert the "+" operator on the right edge of data model object 435*a*.

When a new expression component is hovered over the left or right edge of an existing component, a temporary target placeholder may appear, indicating that the component can be inserted there. The new component is inserted onto a temporary target placeholder with a valid data type for an argument of the new component. Doing so enforces the data types of expression components as the user is creating an expression in the workspace.

Figure 5:
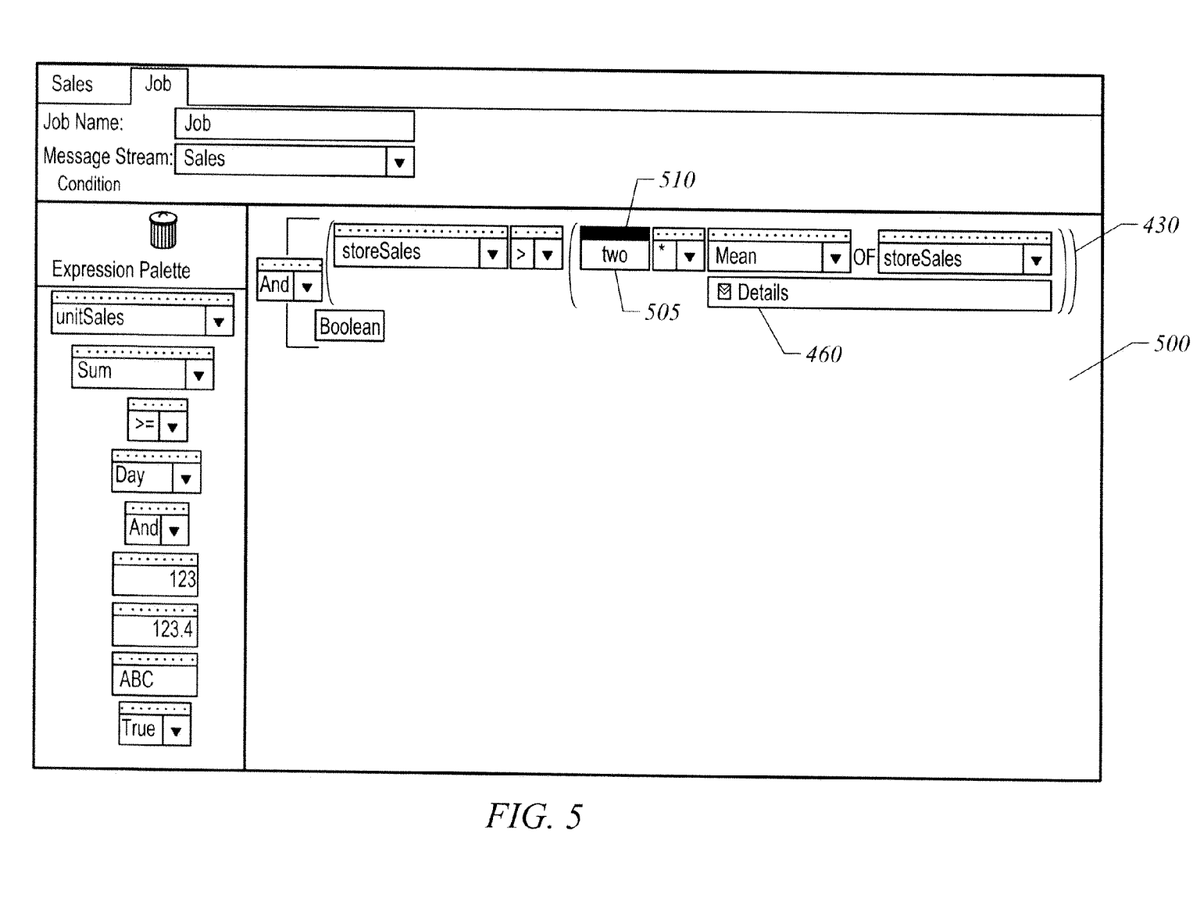
FIG. 5 illustrates another exemplary workspace and graphical palette according to an embodiment of the invention.

Error alerts are displayed to the user whenever the user inserts an expression component onto a placeholder in workspace 400 that is not the expected data type. For example, FIG. 5 illustrates expression 430 in workspace 500 where the user attempts to insert a string constant in placeholder 505, which expects a numeric value. An error alert 510 is displayed to the user as a highlighted area on top of the textbox corresponding to placeholder 505. A message (not shown) may also appear to the user indicating the expected data type for placeholder 505 and the data type of the provided component.

It is appreciated that error alerts can also arise from selecting a non-numerical data model object, e.g., a brand name, store location, etc., for an aggregation requiring numerical values, e.g., mean, sum, etc., or comparing a value with a data model object that is not the same data type, e.g., comparing a string value to store sales or a Boolean to a brand name.

When an error alert is displayed to the user, the user may exchange the component provided for a component having the expected data type. The user can delete the existing component and add a new component to the revealed placeholder, e.g., placeholder 505, or place the new component directly on top of the existing component. To exchange an existing component for a new component having the same data type, the user can simply select a new value in graphical palette 300 or change the text value in a textbox.

Figure 6:
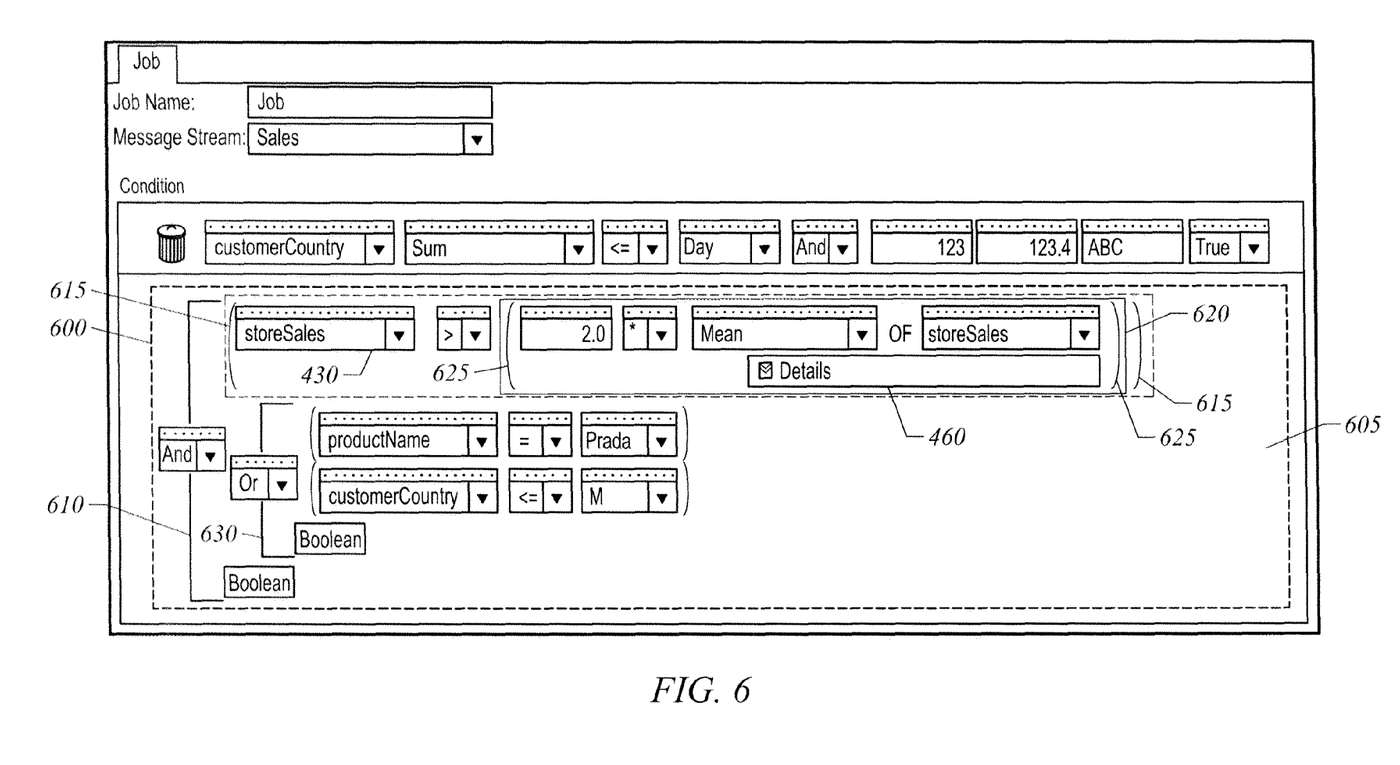
FIG. 6 illustrates a further exemplary workspace and graphical palette according to an embodiment of the invention.

FIG. 6 illustrates how an order of operations is enforced for expressions created according to an embodiment of the invention. Expression 600 created in workspace 605 includes Boolean list operator 610 and sub-expression 615. Sub-expression 615 includes expression 430 within expression delimiters 615. Expression 430 in turn includes sub-expression 620 within nested brackets 625. Both expression delimiters 615 and nested brackets 625 are added automatically by Expression Definition module 150 while the user is creating expression 600 in workspace 605. The expression delimiters 615 and nested brackets 625 are added to illustrate an order of operations to the user.

According to an embodiment of the invention, Expression Definition module 150 also presents expressions in the workspace in a well segmented, structured visualization. For example, expression 600 in workspace 605 is to be evaluated according to sub-expression 630. Sub-expression 630 specifies that in addition to having "storeSales" greater than two times the mean of "storeSales," the data must also have the product name "Prada" and/or a customer country starting with "M" or a letter previous to "M" in the alphabet. Placing sub-expression 630 below sub-expression 615 in workspace 605 and within Boolean list operator 610 makes it easier for the user to interpret the intention and anticipate the result of expression 600. The visual structure of the expressions created with Expression Definition module 150 also ensures that all semantic relationships within the expressions are preserved and easy to visualize.

A further filtering "Details" window panel, e.g., window panel 460, is provided for aggregation components when they are inserted into the workspace. The "Details" window panel can be expanded to reveal two tabs, namely a "Filter" tab illustrated in FIG. 7 and a "Dimensions" tab illustrated in FIG. 8.

Figure 7:
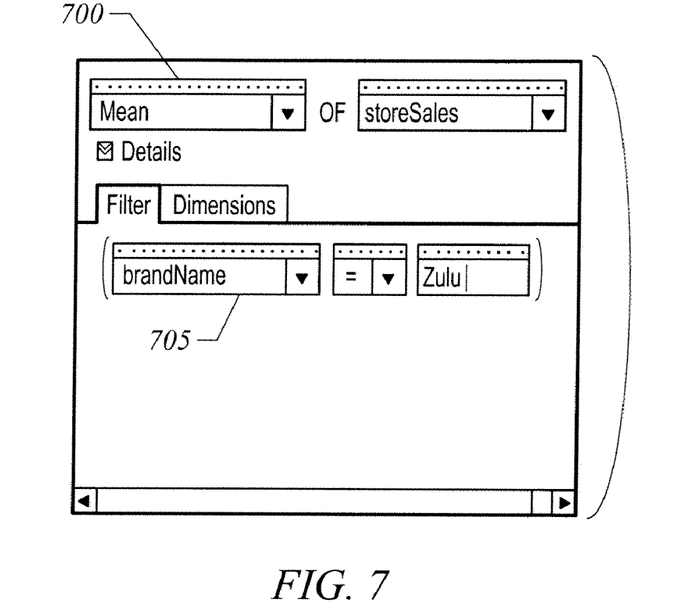
FIG. 7 illustrates an exemplary filter window panel for use within a workspace according to an embodiment of the invention.

The "Filter" tab allows the user to limit the data considered in the aggregation to a subset that satisfy specified criteria. For example, filter tab 700 is a simple filter that specifies that the aggregation "Mean" of "storeSales" is to be performed only for the "Zulu" brand. It is appreciated that users can specify any filter desired, ranging from simple filters such as filter tab 700 to more complex ones involving multiple data model objects, measures, comparisons and the like. Indeed, a filter can be just as complex as any expression that can be built using the expression editor. This provides the user a lot of flexibility in creating and evaluating expressions for a given business analysis.

Figure 8:
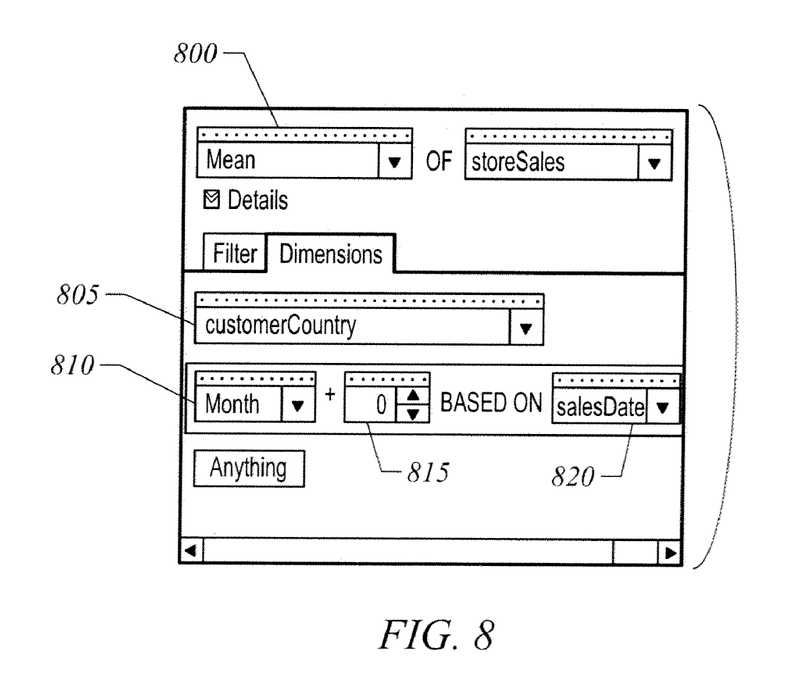
FIG. 8 illustrates an exemplary dimensions window panel for use within a workspace according to an embodiment of the invention.

The "Dimensions" tab allows the user to indicate how an aggregation should be subdivided. In one embodiment, the data source is a message stream and Expression Definition module 150 maintains aggregations as messages are received. The aggregation to select at any given time is based on the values in the current message for the dimensions specified in the "Dimensions" tab. For example, dimensions tab 800 specifies that the store sales mean is to be calculated based on the customer country 805 and sales date month 810 of the current message.

In one embodiment of the invention, sales date month 810 is specified using the "Month" selection in the time period dropdown menu with an offset value 815, which in this case is zero. The offset value 815 indicates which store sales month relative to the sales date month 820 of the current message to use in the aggregation, i.e., "Month+0" is the sales date month of the current message and "Month+(−1)" is the month prior to the sales date month of the current message.

In another embodiment of the invention, the offset 815 is represented by a descriptive word such as "Current," "Previous" and "Next," allowing the user to select time periods such as "Current Month," "Previous Month," "Next Month," and similar designations for other time periods, e.g., calendar year, week, day, hour, quarter, fiscal year, and so on.

Advantageously, the invention provides a user friendly way to create expressions and easily readable expression visualizations that make it easier for the user to visualize the semantic structure of the expressions. By providing guidance and enforcing rules, e.g., enforcing the data type of placeholders and enforcing an order of operations within the expressions, the invention assists users in creating complex expressions without being experts on the expressions' syntax, guides the users towards getting or creating the information/result desired and prevents the user from creating invalid expressions.

The foregoing description, for purposes of explanation, used specific nomenclature to provide a thorough understanding of the invention. However it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, comprising executable instructions to:
provide a workspace for a user to define an expression with expression components from a graphical palette associated with the workspace;
form an initial placeholder in the workspace;
receive an initial expression component from the graphical palette at the initial placeholder and in response form an additional placeholder, wherein the initial placeholder and the additional placeholder lay out the visual structure of expression components in the workspace to illustrate semantic relationships between the expression components;
enforce the data type for each placeholder; and
provide a structured visual representation of each additional expression inserted in the workspace;
wherein:
at least one of the expression components comprises an aggregation, the aggregation having a corresponding graphical user interface element, which when activated, provides a panel to allow a user to specify filters and dimensions for the aggregation;
all of the expression components in the workspace have an associated graphical user interface element, which when activated, results in a drop-down menu comprising alternative expression components to be displayed such that selection of one of the alternative components causes the selected alternative expression element to replace the corresponding expression component;
brackets are inserted in the workspace to enforce an order of operations and to illustrate the order of operations to the user; and
Boolean operators are represented in the workspace as a list within a bracket.

2. The computer readable storage medium of claim 1, wherein the expression components are selected from the list comprising: data model objects; aggregations; functions; operators; Boolean operators; time periods; integer constants; floating point constants; string constants; Boolean constants; and date constants.

3. The computer readable storage medium of claim 1, further comprising executable instructions to initialize the workspace with a Boolean operator and a Boolean placeholder.

4. The computer readable storage medium of claim 1, further comprising executable instructions to create a placeholder in the workspace for each argument required by an expression component added by the user.

5. The computer readable storage medium of claim 2, further comprising executable instructions to create a placeholder for an offset and a placeholder for a date constant or a date variable for each time period added by the user in the workspace.

6. The computer readable storage medium of claim 1, further comprising executable instructions to alert the user when an expression component is added into a placeholder having an incompatible data type.

7. The computer readable storage medium of claim 1, wherein the executable instructions to insert brackets comprise executable instructions to organize sub-expressions within the expression with nested brackets.

8. A non-transitory computer readable storage medium, comprising executable instructions to:
populate a graphical palette with expression components;
provide placeholders in a workspace for a user to create an expression with the expression components from the graphical palette, the expression having one or more aggregations, wherein the placeholders lay out the visual structure of the expression components in the workplace to illustrate semantic relationships between the expression components;
associate filters and dimensions with the one or more aggregations in the expression; and
enforce a data type for each placeholder when the user selects an expression component from the graphical palette;
wherein:
each aggregation has a corresponding graphical user interface element, which when activated, provides a panel in the to allow a user to specify filters and dimensions for the aggregation;
all of the expression components in the workspace have an associated graphical user interface element, which when activated, results in a drop-down menu comprising alternative expression components to be displayed such that selection of one of the alternative components causes the selected alternative expression element to replace the corresponding expression component;
brackets are inserted in the workspace to enforce an order of operations and to illustrate the order of operations to the user; and
Boolean operators are represented in the workspace as a list within a bracket.

9. The computer readable storage medium of claim 8, wherein the expression components are selected from the list comprising: data model objects; aggregations; functions; operators; Boolean operators; time periods; integer constants; floating point constants; string constants; Boolean constants; and date constants.

10. The computer readable storage medium of claim 9, wherein data model objects comprise measures associated with a data source.

11. The computer readable storage medium of claim 10, wherein the aggregations are performed on values related to one or more of the data model objects, measures associated with the data source and results from a portion of the expression.

12. The computer readable storage medium of claim 11, wherein the executable instructions to associate filters and dimensions with the one or more aggregations comprise executable instructions to limit the one or more aggregations to a subset of dimensions associated with the data source.

13. The computer readable storage medium of claim 9, further comprising executable instructions to provide a structured visual representation of the expression as the expression components are inserted in the workspace.

14. A method for creating expressions, the method being implemented by one or more data processors and comprising:
providing, by at least one data processor, a graphical palette of expression components;
providing, by at least one data processor, a workspace for a user to create expressions from the expression components; forming an initial placeholder in the workspace;
receiving, by at least one data processor, an initial expression component from the graphical palette at the initial placeholder;
forming, by at least one data processor, an additional placeholder in response to receiving, wherein the initial placeholder and the additional placeholder lay out the visual structure of expression components in the workplace to illustrate semantic relationships between the expression components;

enforcing, by at least one data processor, data types for expression components when inserted into the workspace; and providing, by at least one data processor, a structured visual representation of additional expression components inserted in the workspace;

wherein:
- at least one of the expression components comprises an aggregation, the aggregation having a corresponding graphical user interface element, which when activated, provides a panel in the workspace adjacent to the corresponding expression component to allow a user to specify filters and dimensions for the aggregation;
- brackets are inserted in the workspace to enforce an order of operations and to illustrate the order of operations to the user; and
- Boolean operators are represented in the workspace as a list within a bracket.

15. The method of claim 14, wherein providing a graphical palette of expression components comprises providing sets of expression components for selection by the user.

16. The method of claim 14, wherein enforcing data types for expression components comprises indicating a data type for each placeholder and alerting the user when an expression component is inserted into a placeholder having an incompatible data type.

* * * * *